Oct. 5, 1943.  J. D. O'BRIEN  2,330,839
SUPPLEMENTAL TRACTION DEVICE FOR VEHICLE WHEEL TIRES
Filed June 4, 1941
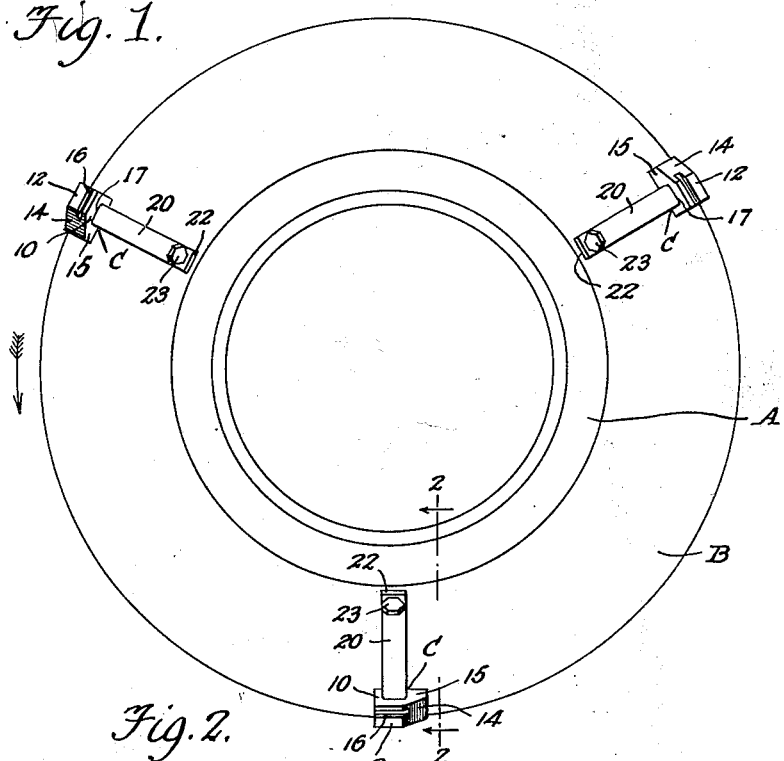
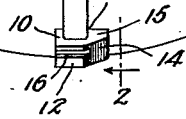
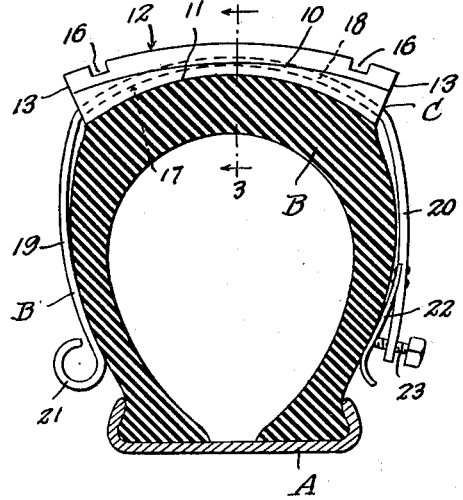
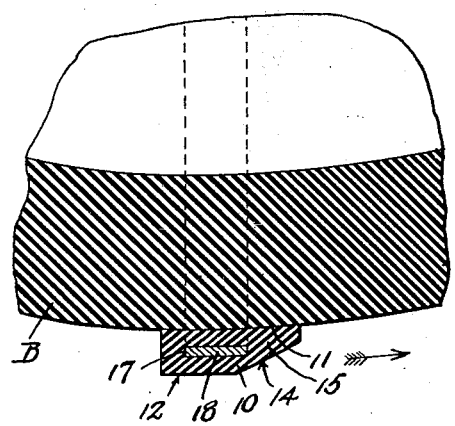
INVENTOR.
JAMES D. O'BRIEN
BY
Clark & Ott
ATTORNEYS Patented Oct. 5, 1943

2,330,839

UNITED STATES PATENT OFFICE 2,330,839

SUPPLEMENTAL TRACTION DEVICE FOR VEHICLE WHEEL TIRES

James D. O'Brien, Brooklyn, N. Y.

Application June 4, 1941, Serial No. 396,536

5 Claims. (Cl. 152—233)

This invention has reference to traction accessories for vehicle wheels and comprehends a device adapted for detachable association with the tire of an automobile wheel and which, when applied thereto, functions to provide supplemental or additional traction which is especially desirable when the vehicle is being driven in snow, sand, mud or upon other soft or slippery surfaces, while at the same time operating to check or minimize lateral skidding.

One of the principal features of the invention resides in the provision of an improved device of the indicated character which is so constructed and arranged as to afford means which inherently functions when engaging with the road surface to retain the device against creeping or relative movement circumferentially of the tire, thereby eliminating the necessity of employing means, such as chains or straps, which extend completely around the tire and rim.

The invention further includes means constituting a part of the device which operates to clamp the device or accessory on the vehicle tire so as to preclude displacement thereof by centrifugal force when the vehicle is traveling at the usual running speeds.

Other objects of the invention reside in a traction accessory for vehicle wheels which is comparatively simple in its construction and which is readily applicable to and removable from the tire of any vehicle wheel whether of the artillery or full disk type.

With the above and other objects in view, the invention is set forth in greater detail in the following specification and illustrated in the accompanying drawing in which:

Fig. 1 is a side view of a vehicle wheel equipped with a plurality of traction devices constructed in accordance with the invention.

Fig. 2 is an enlarged cross sectional view taken approximately on the line 2—2 of Fig. 1.

Fig. 3 is a fragmentary enlarged circumferential sectional view taken on the line 3—3 of Fig. 2.

Referring to the drawing by characters of reference, A designates the rim of a vehicle wheel, B a pneumatic tire and C generally the traction devices or accessories. Each of the accessories or devices C consists of a yieldable resilient pad or strip 10 of rubber, rubber composition or any other equivalent material and the same is formed with an arcuate concave inner surface 11 conforming generally to the portion of the tread surface of the tire B with which it is adapted to engage. The outer surface 12 of the strip or pad 10 is of arcuate convex formation and is of lesser curvature to render the strip thicker adjacent the opposite ends 13 and of progressively decreasing thickness towards the medial portion.

The outer surface 12 is beveled as at 14 throughout the length of the strip or pad to provide a wedge shaped forward or leading portion 15. The remaining portion of the outer surface is formed with transverse grooves 16 adjacent the opposite ends 13. The strip or pad 10 is formed with a longitudinal slot 17 through which the intermediate arcuate portion 18 of a resilient strap or leaf spring member passes with the opposite leg portions 19 and 20 extending at an angle thereto and which leg portions are of substantially arcuate formation to conform to the opposite side walls of the tire B. The leg member 19 is provided with a terminal eye 21 while the free extremity of the leg 20 has anchored to the inner side thereof a clamping spring 22 which is urged into engagement with the side wall of the tire by means of a set screw 23 threaded through the terminal of the leg 20 so as to compensate for variations in the widths of tires to which the device is applied.

In use and operation, the traction device or accessory C is applied to the tire B by engaging the spring legs 19 and 20 in straddling relation with the tire B as clearly illustrated in Fig. 2 of the drawing, thus disposing the inner surface 11 of the strip or pad 10 in engagement with the tread surface of the tire, the length of the strip or pad extending transversely across the tread surface. The set screw 23 is tightened so as to impinge the spring 22 with one side wall of the tire shoe thus causing the opposite leg to grip and clamp the tire to retain the device thereon against radial outward displacement by centrifugal force while permitting of the ready removal of the device or accessory from the tire by unscrewing the set screw 23 and engaging a suitable implement with the eye 21 to pry the device off of the tire.

In applying the device or accessory to the tire, the wedge shaped forward portion 15 is disposed as the leading portion thereof in the direction of rotation of the wheel, so that said wedge shaped portion by being pinched and compressed between the tire tread and road surface functions to inherently act as a means for anchoring the device against creeping or relative movement circumferentially of the tire and prevents slippage or spinning of the wheel by presenting a flattened face for engagement with the road surface. This obviates the necessity of employing chains, straps or other means which completely extend transversely around the tire and rim of the vehicle wheel. The size and number of accessories or devices would depend upon the type of vehicle wheel with which it is used, and the character of the road surface or terrane over which the vehicle is being driven while the grooves 16 serve to prevent lateral skidding.

What is claimed is:

1. A supplemental traction device for vehicle wheel tires including a concavo-convex strip of yieldable resilient material, the inner concave surface of which is adapted to engage with and extend across the tread surface of the tire, said strip having a transversely beveled outer face extending longitudinally thereof and defining a wedge shaped side edge portion disposed so as to constitute the leading edge of the strip in the direction of rotation of the wheel for setting up a wedging action so as to retain the strip against circumferential movement with reference to the tire when in engagement with the ground, a resilient strap extending longitudinally through the strip and having angularly disposed arcuate legs for clamping engagement with the side walls of the tire for retaining the strip thereon against radial outward displacement by centrifugal force, a leaf spring secured to the inner face of one of the legs adjacent the free end thereof, and a set screw threadedly engaged through the terminal of said leg for effecting inward flexing of said leaf spring and impingement thereof against the side wall of the tire for compensating for variations in the widths of the tires to which the device is applied.

2. A supplemental traction device for vehicle wheel tires including a concavo-convex strip of yieldable resilient material, the inner concave surface of which is adapted to engage with and extend across the tread surface of the tire, said strip having a transversely beveled outer face extending longitudinally thereof and defining a wedge shaped side edge portion disposed so as to constitute the leading edge of the strip in the direction of rotation of the wheel for setting up a wedging action to provide the sole means of retaining the strip against circumferential movement when in engagement with the ground, and a resilient strap extending longitudinally through the strip and having angularly disposed arcuate legs for inherent clamping engagement thereof with the opposite side walls of the tire so as to retain the strip thereon against radial outward displacement by centrifugal force.

3. A supplemental traction device for vehicle wheel tires including a strip of yieldable resilient material, the inner surface of which is adapted to engage with and extend across the tread surface of the tire, said strip having a transversely beveled outer face extending longitudinally thereof and defining a wedge shaped side edge portion disposed so as to constitute the leading edge of the strip in the direction of rotation of the wheel to effect a wedging action adapted to retain the strip against circumferential movement with reference to the tire when in engagement with the ground, and means carried by said strip for clamping engagement with the side walls of the tire for retaining the strip thereon against radial outward displacement by centrifugal force.

4. In a supplemental traction device for vehicle wheel tires, a concavo-convex strip of yieldable resilient material providing an inner concave surface adapted to engage with and extend across the tread surface of the tire, said strip having a transversely beveled outer face extending longitudinally thereof and defining a wedge shaped edge portion disposed so as to constitute the leading edge of the strip in the direction of rotation of the wheel, and means carried by said strip for clamping engagement with the side walls of the tire and cooperating together with the strip to retain the same on the tire against circumferential movement with reference to the tire and against radial outward displacement therefrom by centrifugal force.

5. In a supplemental traction device for vehicle wheel tires, a concavo-convex strip of yieldable resilient material, the inner concave surface of which is of a curvature adapted to conform to, engage with and extend across the tread surface of the tire and the outer convex surface of which is of lesser curvature than the inner surface to render the strip of greater thickness adjacent the opposite ends and of progressively decreasing thickness towards the medial portion, said strip having a transversely beveled outer face extending longitudinally thereof and defining a wedge shaped side edge portion disposed so as to constitute the leading edge of the strip in the direction of rotation of the wheel, and means carried by said strip for clamping engagement with the side walls of the tire to retain the same thereon.

JAMES D. O'BRIEN.